(12) United States Patent
Asper

(10) Patent No.: US 9,440,494 B2
(45) Date of Patent: Sep. 13, 2016

(54) AIRLESS TIRE CONSTRUCTION HAVING MULTIPLE LAYERS

(71) Applicant: Bridgestone Americas Tire Operations, LLC, Nashville, TN (US)

(72) Inventor: Robert Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/078,153

(22) Filed: Mar. 23, 2016

(65) Prior Publication Data

US 2016/0200145 A1 Jul. 14, 2016

Related U.S. Application Data

(63) Continuation of application No. 14/572,996, filed on Dec. 17, 2014, now Pat. No. 9,321,312.

(60) Provisional application No. 61/920,528, filed on Dec. 24, 2013.

(51) Int. Cl.
*B60B 1/06* (2006.01)
*B60C 7/14* (2006.01)
*B29D 30/02* (2006.01)
*B33Y 80/00* (2015.01)

(52) U.S. Cl.
CPC .............. *B60C 7/14* (2013.01); *B29D 30/02* (2013.01); *B33Y 80/00* (2014.12); *B60C 2007/146* (2013.04)

(58) Field of Classification Search
CPC ........... B60C 7/10; B60C 7/12; B60C 7/125; B60C 7/14; B60C 2007/107; B60C 2007/146
See application file for complete search history.

(56) References Cited

U.S. PATENT DOCUMENTS

| 650,621 A | 5/1900 | Stevens |
| 1,072,260 A | 9/1913 | Reed |
| 1,312,491 A | 8/1919 | McClenathen |
| 1,806,857 A | 5/1931 | Liebau |
| 2,366,638 A | 1/1945 | Miller |
| 2,998,053 A | 8/1961 | Appleby |
| 3,724,521 A | 4/1973 | Coddington et al. |
| 3,954,538 A | 5/1976 | Grawey |
| 4,235,270 A | 11/1980 | Kahaner et al. |
| 4,934,425 A | 6/1990 | Gajewski et al. |
| 4,944,563 A | 7/1990 | Pinchbeck et al. |

(Continued)

FOREIGN PATENT DOCUMENTS

| GB | 102854 | 3/1917 |
| JP | 2004-161042 | 6/2004 |

OTHER PUBLICATIONS

Lee, Chang Ho, International Search Report with Written Opinion from PCT/US2014/070710; Apr. 17, 2015.

(Continued)

*Primary Examiner* — John Walters
*Assistant Examiner* — James Triggs
(74) *Attorney, Agent, or Firm* — Bridgestone Americas Tire Operations, LLC

(57) ABSTRACT

An airless tire has a wheel portion and a webbing extending from the wheel portion towards an axis of rotation of the airless tire. The diameter of an annular outer surface of the wheel portion varies along an axial direction of the airless tire.

25 Claims, 4 Drawing Sheets

(56) References Cited

U.S. PATENT DOCUMENTS

| | | | |
|---|---|---|---|
| 4,945,962 A | 8/1990 | Pajtas | |
| 5,042,544 A | 8/1991 | Dehasse | |
| 5,050,656 A | 9/1991 | Ho | |
| 5,086,815 A | 2/1992 | Panaroni et al. | |
| 5,090,464 A | 2/1992 | Kauzlarich et al. | |
| 5,139,066 A | 8/1992 | Jarman | |
| 5,168,910 A | 12/1992 | Zhang et al. | |
| 5,174,634 A | 12/1992 | Blanck et al. | |
| 5,223,599 A | 6/1993 | Gajewski | |
| 5,225,010 A | 7/1993 | Shisheng | |
| 5,236,027 A | 8/1993 | Lu | |
| 5,265,659 A | 11/1993 | Pajtas et al. | |
| 5,343,916 A | 9/1994 | Duddey et al. | |
| 5,353,853 A | 10/1994 | Hansson | |
| 5,390,985 A | 2/1995 | Chandler | |
| RE34,909 E | 4/1995 | Kindel et al. | |
| 5,435,367 A | 7/1995 | Price | |
| 5,460,213 A | 10/1995 | Pajtas | |
| 5,494,090 A | 2/1996 | Kejha | |
| 5,743,316 A | 4/1998 | Chrobak | |
| 5,879,484 A * | 3/1999 | Spragg | B29D 30/3028 152/516 |
| 6,032,710 A | 3/2000 | Milman | |
| 6,170,544 B1 | 1/2001 | Hottebart | |
| 6,213,561 B1 | 4/2001 | Witthaus | |
| 6,250,355 B1 | 6/2001 | Provitola | |
| 6,279,630 B1 | 8/2001 | Herbert IMS | |
| 6,298,891 B1 | 10/2001 | Harris | |
| 6,374,887 B1 | 4/2002 | Subotics | |
| 6,431,235 B1 | 8/2002 | Steinke | |
| 6,450,222 B1 | 9/2002 | Fleming | |
| 6,640,859 B1 | 11/2003 | Laurent et al. | |
| 6,681,822 B2 | 1/2004 | Adams et al. | |
| 6,698,480 B1 | 3/2004 | Comellier | |
| 6,971,426 B1 | 12/2005 | Steinke | |
| 6,994,134 B2 | 2/2006 | Grah | |
| 6,994,135 B2 | 2/2006 | Delfino et al. | |
| 7,013,939 B2 * | 3/2006 | Rhyne | B60B 1/0223 152/246 |
| 7,032,634 B2 | 4/2006 | Laurent et al. | |
| 7,032,637 B2 | 4/2006 | Meraldi | |
| 7,044,180 B2 | 5/2006 | Rhyne et al. | |
| 7,066,225 B2 | 6/2006 | Rhyne et al. | |
| 7,143,797 B2 | 12/2006 | Vannan | |
| 7,159,632 B2 | 1/2007 | Fukui | |
| 7,174,936 B2 | 2/2007 | Becker et al. | |
| 7,201,194 B2 | 4/2007 | Rhyne et al. | |
| 7,231,948 B2 | 6/2007 | Forney, III et al. | |
| 7,316,252 B1 | 1/2008 | Heard | |
| 7,418,988 B2 | 9/2008 | Cron et al. | |
| 7,523,773 B2 | 4/2009 | Gabrys et al. | |
| 7,546,862 B2 | 6/2009 | Moon et al. | |
| 7,650,919 B2 | 1/2010 | Rhyne et al. | |
| 7,743,806 B2 | 6/2010 | Abe | |
| 7,950,428 B2 | 5/2011 | Hanada et al. | |
| 7,980,282 B2 | 7/2011 | Moyna et al. | |
| 8,056,593 B2 | 11/2011 | Palinkas et al. | |
| 8,061,398 B2 | 11/2011 | Palinkas et al. | |
| 8,091,596 B2 | 1/2012 | Louden | |
| 8,104,524 B2 | 1/2012 | Manesh et al. | |
| 8,109,308 B2 | 2/2012 | Manesh et al. | |
| 8,113,253 B2 | 2/2012 | Arakawa et al. | |
| 8,141,606 B2 | 3/2012 | Benzing, II et al. | |
| 8,176,957 B2 | 5/2012 | Manesh et al. | |
| 8,215,351 B2 | 7/2012 | Thompson | |
| 8,276,628 B2 | 10/2012 | Hanada et al. | |
| 8,333,437 B2 | 12/2012 | Matsuda et al. | |
| 8,636,490 B1 | 1/2014 | Martin et al. | |
| 2002/0033220 A1 | 3/2002 | Steinke | |
| 2002/0043319 A1 | 4/2002 | Meraldi | |
| 2002/0096237 A1 | 7/2002 | Burhoe et al. | |
| 2003/0024622 A1 | 2/2003 | Chrobak | |
| 2003/0201043 A1 | 10/2003 | Adams et al. | |
| 2003/0205306 A1 | 11/2003 | Steinke | |
| 2003/0213541 A1 | 11/2003 | Laurent et al. | |
| 2003/0226630 A1 | 12/2003 | Delfino et al. | |
| 2004/0140032 A1 | 7/2004 | Rhyne et al. | |
| 2004/0144464 A1 | 7/2004 | Rhyne et al. | |
| 2004/0159385 A1 | 8/2004 | Rhyne et al. | |
| 2004/0187996 A1 | 9/2004 | Grah | |
| 2005/0072507 A1 | 4/2005 | Chrobak et al. | |
| 2005/0133133 A1 | 6/2005 | Becker et al. | |
| 2005/0205181 A1 | 9/2005 | Forney, II et al. | |
| 2005/0263229 A1 | 12/2005 | Steinke | |
| 2005/0269005 A1 | 12/2005 | Steinke | |
| 2006/0005903 A1 | 1/2006 | Fry et al. | |
| 2006/0060280 A1 | 3/2006 | Ladouce et al. | |
| 2006/0096685 A1 | 5/2006 | Fukui | |
| 2006/0113016 A1 | 6/2006 | Cron et al. | |
| 2006/0144488 A1 | 7/2006 | Vannan | |
| 2006/0169797 A1 | 8/2006 | Kaltenheuser | |
| 2006/0174989 A1 | 8/2006 | Jones | |
| 2006/0249236 A1 | 11/2006 | Moon et al. | |
| 2006/0260729 A1 | 11/2006 | Cogne et al. | |
| 2007/0006951 A1 | 1/2007 | Summers | |
| 2007/0029020 A1 | 2/2007 | Wietham et al. | |
| 2007/0089820 A1 | 4/2007 | Gabrys et al. | |
| 2007/0119531 A1 | 5/2007 | Steinke et al. | |
| 2007/0215259 A1 | 9/2007 | Burns | |
| 2007/0267116 A1 | 11/2007 | Rhyne et al. | |
| 2008/0053586 A1 * | 3/2008 | Hanada | B60C 7/08 152/310 |
| 2008/0073014 A1 | 3/2008 | Abe | |
| 2008/0105350 A1 | 5/2008 | Steinke | |
| 2008/0116737 A1 | 5/2008 | St. George | |
| 2008/0314486 A1 | 12/2008 | Manesh et al. | |
| 2009/0095389 A1 | 4/2009 | Moyna et al. | |
| 2009/0107596 A1 | 4/2009 | Palinkas et al. | |
| 2009/0120548 A1 | 5/2009 | Norbits | |
| 2009/0183810 A1 | 7/2009 | Vannan et al. | |
| 2009/0211674 A1 | 8/2009 | Hanada et al. | |
| 2009/0211675 A1 | 8/2009 | Louden | |
| 2009/0211677 A1 | 8/2009 | Palinkas et al. | |
| 2009/0211678 A1 | 8/2009 | Palinkas et al. | |
| 2009/0211681 A1 | 8/2009 | Palinkas et al. | |
| 2009/0250149 A1 | 10/2009 | Sebe | |
| 2009/0283185 A1 | 11/2009 | Manesh et al. | |
| 2009/0294000 A1 | 12/2009 | Cron | |
| 2009/0301625 A1 | 12/2009 | Moon et al. | |
| 2010/0018621 A1 | 1/2010 | Thompsom | |
| 2010/0051153 A1 * | 3/2010 | Kojima | B60C 1/0016 152/209.1 |
| 2010/0071819 A1 | 3/2010 | McCulley | |
| 2010/0078111 A1 | 4/2010 | Anderson et al. | |
| 2010/0108215 A1 | 5/2010 | Palinkas et al. | |
| 2010/0132858 A1 | 6/2010 | Arakawa et al. | |
| 2010/0132865 A1 | 6/2010 | Iwase et al. | |
| 2010/0141019 A1 | 6/2010 | Honiball et al. | |
| 2010/0193097 A1 | 8/2010 | McNier et al. | |
| 2010/0200131 A1 | 8/2010 | Iwase et al. | |
| 2010/0218869 A1 | 9/2010 | Abe | |
| 2010/0300587 A1 | 12/2010 | Benzing, II et al. | |
| 2010/0307653 A1 | 12/2010 | Delfino et al. | |
| 2010/0314014 A1 | 12/2010 | Burns | |
| 2011/0000596 A1 | 1/2011 | Sachdev et al. | |
| 2011/0011506 A1 | 1/2011 | Manesh et al. | |
| 2011/0024008 A1 | 2/2011 | Manesh et al. | |
| 2011/0030861 A1 | 2/2011 | Wichern | |
| 2011/0030866 A1 | 2/2011 | Fadel et al. | |
| 2011/0079335 A1 | 4/2011 | Manesh et al. | |
| 2011/0079336 A1 | 4/2011 | Thenault et al. | |
| 2011/0108173 A1 | 5/2011 | Abe | |
| 2011/0146872 A1 | 6/2011 | Tercha et al. | |
| 2011/0168313 A1 | 7/2011 | Ma et al. | |
| 2011/0180194 A1 | 7/2011 | Anderson et al. | |
| 2011/0240189 A1 | 10/2011 | Dutton | |
| 2011/0240190 A1 | 10/2011 | Summers et al. | |
| 2011/0240193 A1 | 10/2011 | Matsuda et al. | |
| 2011/0240194 A1 | 10/2011 | Summers et al. | |
| 2011/0248554 A1 | 10/2011 | Chon et al. | |
| 2011/0277893 A1 | 11/2011 | Benzing, II | |
| 2011/0290394 A1 | 12/2011 | Luchini et al. | |
| 2012/0031535 A1 | 2/2012 | Thompson | |
| 2012/0031536 A1 | 2/2012 | Re Fiorentin et al. | |

(56) References Cited

U.S. PATENT DOCUMENTS

| | | |
|---|---|---|
| 2012/0038206 A1 | 2/2012 | Chadwick et al. |
| 2012/0038207 A1 | 2/2012 | Williams et al. |
| 2012/0048440 A1 | 3/2012 | Lettieri et al. |
| 2012/0060991 A1 | 3/2012 | Mun et al. |
| 2012/0067481 A1 | 3/2012 | Cron |
| 2012/0193004 A1 | 8/2012 | Anderson et al. |
| 2012/0193005 A1 | 8/2012 | McCulley |
| 2012/0205017 A1 | 8/2012 | Endicott |
| 2012/0216932 A1 | 8/2012 | Cron et al. |
| 2012/0223497 A1 | 9/2012 | Radziszewski et al. |
| 2012/0234444 A1 | 9/2012 | Palinkas et al. |
| 2012/0234445 A1 | 9/2012 | Manesh et al. |
| 2012/0241062 A1* | 9/2012 | Manesh ................ B60B 9/00 152/311 |
| 2012/0241531 A1 | 9/2012 | Werner |
| 2012/0247635 A1 | 10/2012 | Manesh et al. |
| 2012/0318417 A1 | 12/2012 | Dotson et al. |
| 2012/0318418 A1 | 12/2012 | Benzing, II et al. |
| 2012/0318421 A1 | 12/2012 | Matsuda et al. |
| 2013/0014874 A1 | 1/2013 | Moon |
| 2013/0048174 A1 | 2/2013 | Cron |
| 2013/0154342 A1 | 6/2013 | Chiang |
| 2014/0062168 A1 | 3/2014 | Martin et al. |
| 2016/0016433 A1 | 1/2016 | Amstutz et al. |

OTHER PUBLICATIONS

Johns, Hilary L.; U.S. Office Action from U.S. Appl. No. 14/335,241, filed Jul. 18, 2014; Feb. 16, 2016.

Bai, Lingfei, International Preliminary Report on Patentability from PCT/US2014/070710; Jun. 28, 2016.

* cited by examiner

AIRLESS TIRE CONSTRUCTION HAVING MULTIPLE LAYERS

CROSS-REFERENCE TO RELATED APPLICATIONS

This application is a continuation of U.S. patent application Ser. No. 14/572,996, filed on Dec. 17, 2014, which claims priority from U.S. Provisional Patent Application No. 61/920,528, filed on Dec. 24, 2013. The disclosure of these applications is incorporated by reference herein in their entirety.

FIELD OF INVENTION

The present disclosure relates to an airless tire. More particularly, the present disclosure relates to an airless tire having varying attributes.

BACKGROUND

Airless, or non-pneumatic tires known in the art include spokes or spoke rings each having the same stiffness and the same diameter. These prior art spokes buckle or deflect upon contact with the ground, and create a contact patch shape with substantially straight leading and trailing edges. These prior art spokes may be constructed of a material that is relatively stronger in tension than in compression, such that when the lower spokes buckle, the load can be distributed through the remaining portion of the wheel.

SUMMARY

In one embodiment, an airless tire includes a plurality of spoke rings, including adjacent first and second spoke rings, each having an annular outer surface and an annular inner surface with a plurality of spokes extending between the outer and inner surfaces. In this embodiment, the first spoke ring has a different diameter from the second spoke ring, and a tread layer extends circumferentially around the outer surfaces of the spoke rings. Further, the spoke rings may be attached to a hub that, when loaded, causes the spokes above the hub to be tensioned and causes the spokes below the hub to be compressed, and the tensile and compression forces may be equal in magnitude. The airless tire may also include a shear band disposed about the outer annular surfaces of the spoke rings. The tire may form a contact patch shape with a rounded leading edge when a load is applied to the tire. The first and second spoke rings may have different stiffnesses. Additionally, the tire may include a third spoke ring that includes a plurality of spokes, wherein the spokes of the third spoke ring may not be aligned with the spokes of the first spoke ring along an axis of rotation of the tire. Finally, the spoke rings may be made from a material selected from the group consisting of corded carbon-filled rubber, nylon, polyester, glass or aramid fibers with resin, thermoplastic, and urethane.

In another embodiment, a tire comprises a wheel having an axis of rotation and an annular outer surface. The distance between the axis of rotation and the annular outer surface of the wheel varies along an axial direction. The tire further includes a webbing extending from an annular inner surface of the wheel portion towards the axis of rotation. The tire further may include a shear band on the outer annular surface of the wheel portion, wherein the webbing in the lower region of the wheel portion may be compressed and the webbing in an upper region of the wheel may be tensioned when the wheel is loaded. A stiffness of the webbing may vary along an axial direction, and the webbing may be attached to a hub in the center of the tire. The webbing may further comprise a plurality of spoke rings, and the tire may form a contact patch shape with a rounded leading edge. Finally, the webbing may be formed by an additive manufacturing process.

In yet another embodiment, a non-pneumatic tire comprises a plurality of spoke rings, including a first spoke ring between second and third spoke rings. The spoke rings include annular outer and annular inner surfaces and a plurality of spokes extending between the outer and inner annular surfaces. The first spoke ring has a first outer diameter and the second spoke ring has a second outer diameter different from the first outer diameter, and the third spoke ring has a third outer diameter approximately equal to the second outer diameter. The tire may also include a tread portion covering an outer surface of the plurality of spoke rings. The first spoke ring may further include a first spoke region having a first thickness and a second spoke region having a smaller second thickness. Further, the second spoke ring may include a third spoke region with a third thickness and a fourth spoke region with a fourth thickness, where the third thickness may be greater than the fourth thickness and where the first spoke region abuts the fourth spoke region, and wherein the second spoke region abuts the third spoke region. The first spoke ring may have a first stiffness and the second spoke ring may have a second different stiffness, and the third spoke ring may have a third stiffness approximately equal to the second stiffness. A shear band may be included on the outer annular surfaces of the spoke rings, where the spokes in the lower regions of the spoke rings may compress and the spokes in the upper regions of the spoke rings may be tensioned by the shear band when a load is placed on the tire. Finally, the compression and tension forces may be approximately equal in magnitude.

In still another embodiment, a non-pneumatic tire comprises a hub able to be coupled to a machine, the hub having a rotational axis about which the tire is configured to roll. A support structure including an inner circumferential portion associated with the hub and an outer circumferential portion radially spaced from the inner circumferential portion is further included. The support structure extends between opposed, axially-spaced side edges of the tire, and the support structure includes a plurality of cavities. The tire further includes a tread portion associated with the outer circumferential portion, wherein the support structure includes layers of elastomeric material having opposing faces lying in opposing planes substantially perpendicular to the rotational axis. Finally, some of the layers include apertures that correspond to the cavities, and the layers are chemically bonded together.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Tread" refers to that portion of the tire that comes into contact with the road under normal inflation and load.

Figures 1, 2:
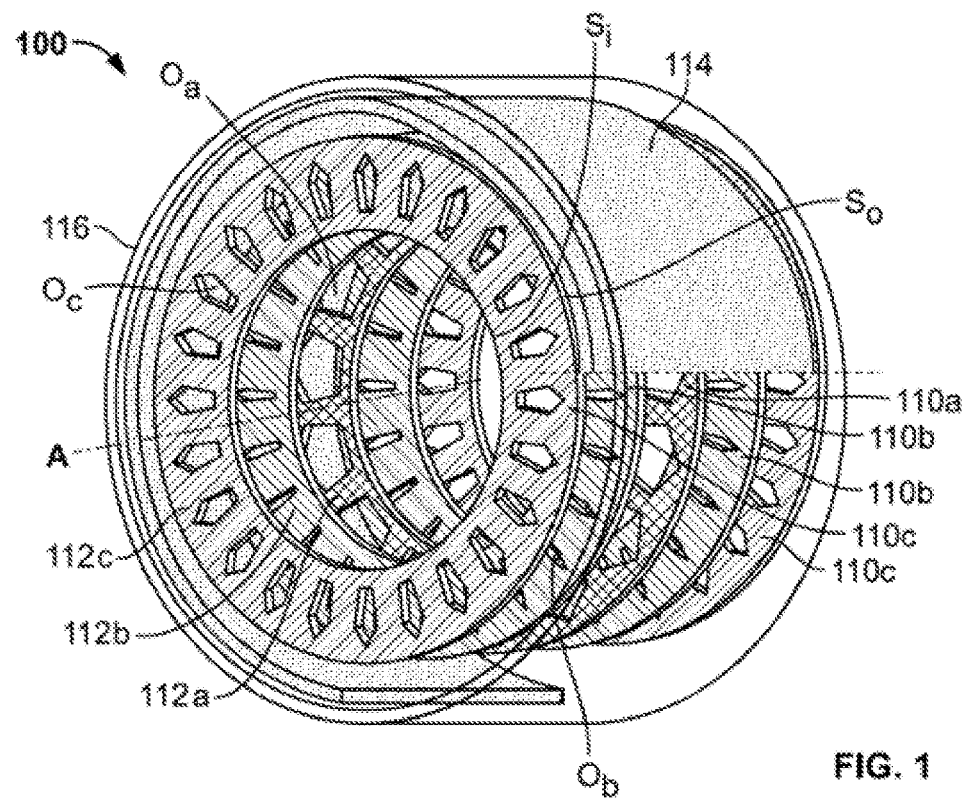
FIG. 1 is a schematic drawing showing a perspective view of one embodiment of an airless tire 100 having multiple spoke rings.
FIG. 2 is a schematic drawing illustrating a cross-section of the airless tire 100.

FIG. 1 illustrates one embodiment of an airless tire 100 having an axis of rotation A passing through its center. Airless tire 100 is constructed of five spoke rings 110, including a central spoke ring 110a, a pair of intermediate spoke rings 110b disposed on each side of the central spoke ring 110a, and a pair of outer spoke rings 110c disposed on either side of intermediate spoke rings 110b. Each of the spoke rings 110 includes a plurality of spokes 112. While five spoke rings are shown in the illustrated embodiment, it should be understood that the airless tire 100 is not limited to any particular number of spoke rings, and may alternatively utilize structures other than spoke rings, such as a unitary structure having a plurality of spokes. The spoke rings 110 may be constructed of materials including, without limitation, corded carbon-filled rubber, nylon, polyester, fibers (glass, aramid, etc.) with resin, thermoplastic, or urethane.

Each spoke ring 110 each has an inner annular surface $S_I$ and an outer annular surface $S_O$ that defines an inner diameter and a maximum outer diameter, respectively. In the illustrated embodiment, the maximum outer diameters of all five spoke rings 110 are equal. In alternative embodiments, the maximum outer diameters of the spoke rings may vary.

In the illustrated embodiment, each spoke 112 extends from the inner annular surface $S_I$ to the outer annular surface $S_O$ of the respective spoke ring 110. The spokes 112 define openings $O_S$ between one another. For illustrative purposes, the openings $O_S$ are shown as pentagon-shaped. However, it should be understood that the openings $O_S$ may have any geometric shape. In an alternative embodiment (not shown), the spokes may form a more complex webbing rather than extend from the inner annular surface $S_I$ to the outer annular surface $S_O$.

Each spoke ring 110 has a stiffness k. As one of ordinary skill in the art would understand, the stiffness of a spoke ring may be defined by a number of factors, including, without limitation, the material of the spoke ring and the geometry of the spokes and openings. Spoke rings with a higher stiffness are more resistant to deformation and compression. In one embodiment, central spoke ring 110a has a first stiffness $k_a$, intermediate spoke rings 110b each have substantially the same second stiffness $k_b$, and outer spoke rings 110c each have substantially the same third stiffness $k_c$. In one embodiment, the second stiffness $k_b$ is greater than the first stiffness $k_a$, and the third stiffness $k_c$ is greater than both the first stiffness $k_a$ and the second stiffness $k_b$. In an alternative embodiment, the first stiffness $k_a$ is greater than both the second stiffness $k_b$ and the third stiffness $k_c$, and the second stiffness $k_b$ is greater than the third stiffness $k_c$. In another alternative embodiment, the second stiffness $k_b$ is greater than both the first stiffness $k_a$ and the third stiffness $k_c$, and the third stiffness $k_c$ is greater than the first stiffness $k_a$.

With continued reference to FIG. 1, the central spoke ring 110a is shown as having a relatively lower number of spokes 112a, with the spokes 112a being separated by relatively larger openings $O_a$. As one of ordinary skill in the art would understand, this geometry would result in a relatively low first stiffness $k_a$. This low first stiffness $k_a$ may be achieved by other means, such as with the use of different materials, construction methods, or geometries.

Intermediate spoke rings 110b are shown as having more spokes 112b than central spoke ring 110a. The spoke openings $O_p$ of intermediate spoke rings 110b are narrower than spoke openings $O_a$ located within central spoke ring 110a. Additionally, spokes 112b of intermediate spoke rings 110b are thicker than spokes 112a of central spoke ring 110a. Both intermediate spoke rings 110b have the same geometry and the same stiffness $k_b$. One of ordinary skill in the art would understand that this geometry would result in a relatively higher stiffness $k_b$ than the central spoke ring stiffness $k_a$. Alternatively, the intermediate stiffness $k_b$ of spoke rings 110b may be achieved by other means, such as with the use of different materials, construction methods, or geometries for intermediate spoke rings 110b.

Outer spoke rings 110c are shown in FIG. 1 as having more spokes 112c than intermediate spoke ring 110b, with spokes 112c being separated by relatively larger openings $O_c$ than those of the intermediate spoke ring openings $O_b$. In this embodiment, both outer spoke rings 110c have the same spoke geometry, and the same stiffness $k_c$. One of ordinary skill in the art would understand that the geometry of the outer spoke rings 110c and the larger relative size of the outer spoke ring openings $O_c$ would cause the outer spoke rings 110c to have a lower stiffness than intermediate spoke rings 110b. Alternatively, the stiffness $k_c$ of outer spoke rings 110c may be achieved by other means, such as with the use of different materials, construction methods, or geometries for spoke rings 110c.

In the illustrated embodiment, the five spoke rings 110 have three different stiffnesses. In the illustrated embodiment, the intermediate spoke rings 110b have the highest stiffness, and the central spoke ring 110a has the lowest stiffness. It should be understood that any number of spoke rings having any number of different stiffnesses may be selected. After the stiffnesses of the spoke rings have been selected, the spoke rings are arranged in a desired manner, suitable to a particular application. For example, the stiffness of each ring may be selected to produce a tire having desired characteristics, such as low noise, low vibrations, or low rolling resistance.

When airless tire 100 is placed in contact with the ground in a load-bearing condition, airless tire 100 contacts the ground to form a tire contact patch shape (not shown in FIG. 1). Because the airless tire contact patch shape will be dictated by the stiffness of the spoke rings 110, in addition to other factors, a design engineer can alter the contact patch shape of the airless tire by varying the stiffness of the spoke rings 110 across the width of the airless tire. This could be done to produce a curved leading edge of the contact patch shape that is desirable when concerned with ride harshness and impact isolation. Further stiffness changes can be used to optimize the contact patch shape for off-highway tires, reducing soil compaction, a key design parameter for certain applications.

FIG. 1 depicts the spokes 112 of corresponding like spoke rings 110 being arranged in alignment with one another. For example, the spokes 112c and openings $O_c$ of each outer spoke ring 110c are aligned with each other, and the spokes 112b and openings $O_b$ of each intermediate spoke ring 110b are aligned with each other. In an alternative embodiment, the spokes 112 and openings $O_S$ of corresponding like spoke rings are not in alignment with each other. It will be apparent to one of ordinary skill in the art that various alignments of spoke rings 110 will cause airless tire 100 to have different performance properties. When spoke rings 110 are not aligned with each other, spokes 112 of similar spoke rings 110 enter the contact patch shape area at a different time when airless tire 100 is rolling. The spoke rings 110 may also be aligned such that each spoke 112 of the all spoke rings 110 enters the contact patch area at a different time when airless tire 100 is rolling. One of ordinary skill in the art would be able to select an alignment providing desired performance properties in any particular application.

After the spoke rings 110 are arranged in a desired manner, they are affixed to a non-pneumatic hub (not shown), using known affixing means. Exemplary affixing means include, without limitation, welding, brazing, and the application of adhesive. A high annular strength band 114 is then circumferentially attached about the spoke rings 110. The high annular strength band acts as a structural compression member on the airless tire 100, and increases interlaminar shear strength across the axial length of the airless tire 100. As one of ordinary skill would understand, the high annular strength band 114 could include an elastic center portion, sandwiched between two inelastic outer portions, or be composed of a single composite structure (see prior art U.S. Pat. No. 5,879,484). The high annular strength band 114 may also be referred to as a "shear band" or "band." In an alternative embodiment, the high annular strength band may be omitted.

A tire tread 116 is then wrapped about the high annular strength band 114. The tire tread 116 may include elements, such as ribs, block, lugs, grooves, and sipes as desired to improve the performance of the tire in various conditions.

FIG. 2 shows a cross-section of airless tire 100. As can be seen from this view, each spoke ring 110 of airless tire 100 has the same thickness $S_T$. In alternative embodiments (not shown), the spoke ring thickness of spoke rings may vary. By varying thicknesses $S_T$, the contact patch shape created by airless tire 100 may be adapted to suit a wide range of applications, including agricultural and passenger applications.

Figure 3:
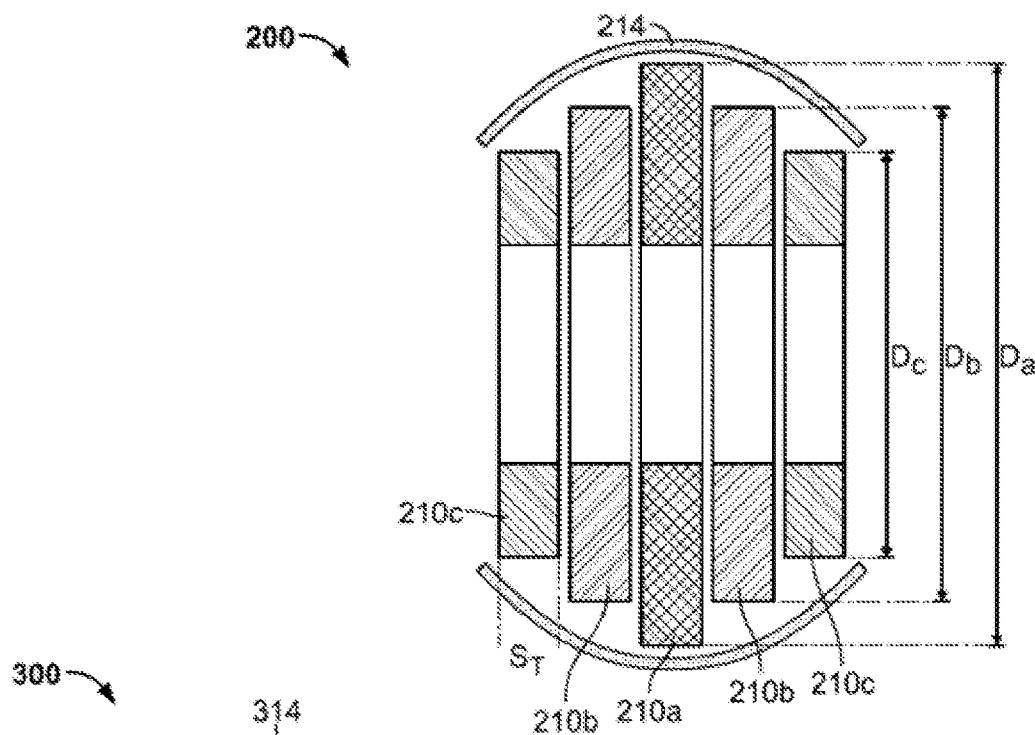
FIG. 3 is a schematic drawing illustrating a cross-section of an alternative embodiment of an airless tire having multiple spoke rings of varying diameter, stiffness, and thickness.

FIG. 3 illustrates a cross section of an alternative embodiment of an airless tire 200. In this embodiment, spoke rings 210 have different maximum outer diameters and different stiffnesses k. The spoke rings 210 in this embodiment have inner diameters $D_1$ that are substantially the same. Each spoke ring 210 may have a unique stiffness k, or may have a common stiffness k with one or more other spoke rings 210. In this embodiment, central spoke ring 210a has a first stiffness $k_a$, intermediate spoke rings 210b each have a second stiffness $k_b$, and outer spoke rings 210c each have a third stiffness $k_c$. In one embodiment, the first stiffness $k_a$ is lower than both the second stiffness $k_b$ and the third stiffness $k_c$. Additionally, the second stiffness $k_b$ is lower than the third stiffness $k_c$. In an alternative embodiment, the first stiffness $k_a$ is greater than both the second stiffness $k_b$ and the third stiffness $k_c$, and the second stiffness $k_b$ is greater than the third stiffness $k_c$. In another alternative embodiment, the second stiffness $k_b$ is greater than both the first stiffness $k_a$ and the third stiffness $k_c$, and the third stiffness $k_c$ is greater than the first stiffness $k_a$.

Each spoke ring 210 may have a unique outer diameter, or may have a common outer diameter with one or more other spoke rings 210. In the illustrated embodiment, central spoke ring 210a has a first maximum outer diameter $D_a$, intermediate spoke rings 210b each have a second maximum outer diameter $D_b$, and outer spoke rings 210c each have a third maximum outer diameter $D_c$. The first maximum outer diameter $D_a$ is greater than the second maximum outer diameter $D_b$, which in turn is greater than the third maximum outer diameter $D_c$. It should be understood that any number of spoke rings having any number of different outer diameters may be employed. After the outer diameters of the spoke rings have been selected, the spoke rings are arranged in a desired manner, suitable to a particular application. For example, the outer diameter of each ring may be selected to produce a tire having desired characteristics, such as low noise, low vibrations, or low rolling resistance.

Use of variable diameter spoke rings allows for a curved or toroidal band (or shear band) to be used in this type of non-pneumatic tire ("NPT") design. The toroidal band allows additional deflection needed to maximize tire contact patch area. This is especially important for off-highway or agricultural tires which need a contact patch shape with a greater area to minimize soil compaction.

In the illustrated embodiment, each spoke ring 210 has a constant outer diameter. In alternative embodiments (not shown), the spoke rings may have variable outer diameters. For example, the outer diameter of each spoke ring may vary in the axial direction, such that when the spoke rings are assembled, the assembly has a smooth, curved outer surface.

Each spoke ring 210 may have a unique thickness, or may have a common thickness $S_T$ with one or more other spoke rings 210. Tread 214 is wrapped around the outer surfaces of spoke rings 210. In an alternative embodiment (not shown), a high annular strength band is disposed between the outer surfaces of the spoke rings and the tread.

Figure 4:
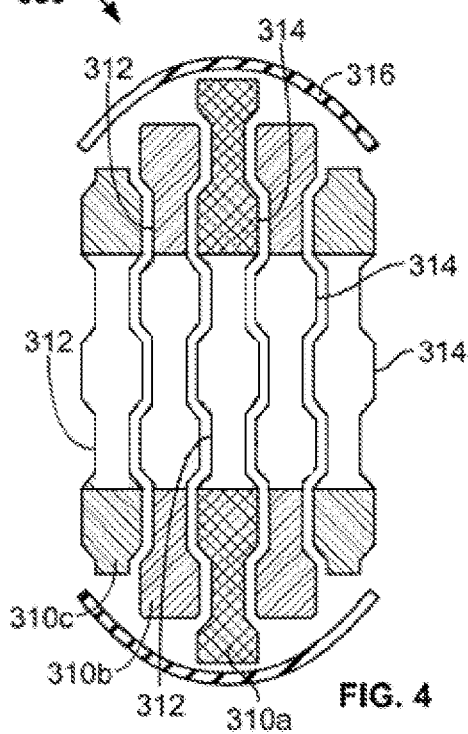
FIG. 4 is a schematic drawing illustrating a cross-section of another alternative embodiment of an airless tire having multiple spoke rings of varying diameter, stiffness, and thickness, with each spoke ring having convex and concave portions.

FIG. 4 illustrates a cross section of another alternative embodiment of an airless tire 300. The tire 300 is substantially similar to the tire 200 discussed above, except for the differences identified below.

In this embodiment, each spoke ring 310 has concave portions 312 and convex portions 314 that alternate along the sides of spoke rings 310. When aligned, the concave portions 312 and convex portions 314 of adjacent spoke rings 310 abut each other, as seen in FIG. 4. This configuration may provide increased rigidity and support among the spoke rings 310. Alternatively, spoke rings 310 may include other structures that adjoin to one another, such as protrusions in one spoke ring and depressions to receive the protrusions in another spoke ring. Tread 316 circumferentially surrounds spoke rings 310.

Figure 5:
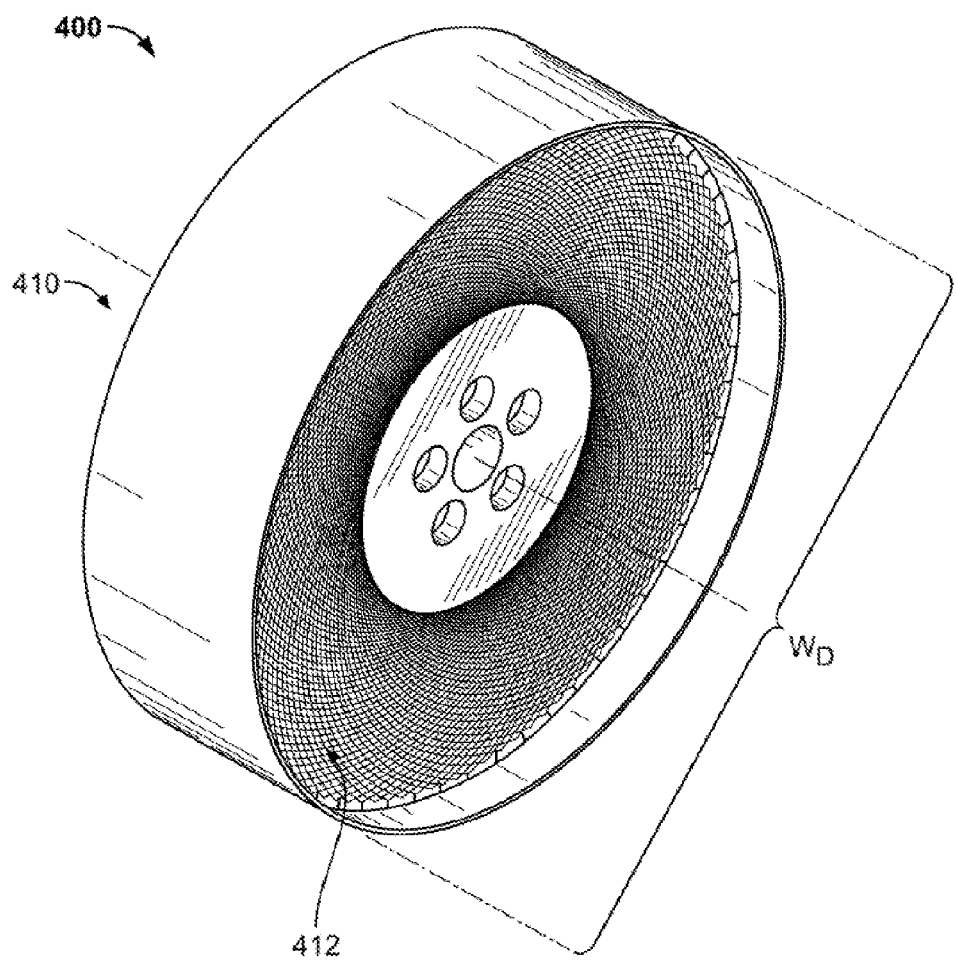
FIG. 5 is a perspective view of still another alternative embodiment of an airless tire, having a unitary wheel portion and webbing.

FIG. 5 illustrates a perspective view of yet another alternative embodiment of an airless tire 400. In the illustrated embodiment, the airless tire 400 has a single wheel portion 410. Wheel portion 410 may be a single unitary structure, or may be made up of a plurality of spoke rings 110 fused together. Wheel portion 410 has a webbing 412 instead of spokes that extend from an inner annular surface to an outer annular surface. The webbing 412 may be any pattern or shape sufficient to provide support. The maximum outer diameter $W_D$ of wheel portion 410 may vary along an axial direction. For example, the maximum outer diameter may be greater in an equatorial plane and smaller towards the sides of airless tire 400.

The stiffness k of the webbing portion 412 may vary along an axial direction of wheel portion 410. A varying stiffness k throughout wheel portion 410 can be achieved in several ways. In one embodiment, several spoke rings 110 having various stiffnesses k are fused together. In an alternative embodiment, different materials are used in the wheel portion 410 during manufacture to create pre-stresses within the wheel portion. In another alternative embodiment, the webbing has varying geometry in an axial direction, which causes the stiffness to vary in the axial direction. The webbing geometry may be varied through molding or machining processes, or by a 3D printing or additive manufacturing process. Those of ordinary skill in the art will understand that other methods known in the art may be used to provide a varying axial stiffness within wheel portion 410.

In the embodiment shown in FIG. 5, non-pneumatic hub 414 is affixed to the center of webbing 412 using known affixing means. Exemplary affixing means include, without limitation, welding, brazing, and the application of adhesive. Non-pneumatic hub 414 can be attached to a vehicle in a similar manner as a wheel in a conventional tire. In other embodiments, additional webbing 412 can be used instead of non-pneumatic hub 414.

The spoke rings and webbing disclosed in the embodiments of FIGS. 1-5 may cause the airless tire 100, 200, 300, 400 to form a rounded contact patch shape when in contact with the ground. The rounded contact patch shape reduces the effects of road impact and noise. The curvature of the rounded contact patch shape can be determined by various factors, including, without limitation, each spoke ring's stiffness, outer diameter, thickness, spoke geometry, number of spokes, shape and number of openings, and the number of spoke rings included in airless tire. By varying these parameters, the airless tire may be adapted to suit a wide range of applications, including agricultural applications and passenger vehicle applications. For example, in some applications such as use in agricultural vehicles, uniform contact pressure and maximized contact area may be desired. An airless tire with a rounded contact patch shape (or rounded band) can be designed to deflect more at low loads maximizing contact area and minimizing soil compaction. An airless tire with flat contact patch shape loses the ability to deflect in the radial direction at different rates across its axial width which will cause less deflection, and less contact patch area, especially at light load conditions. An airless tire with a rounded contact patch shape will result in superior (reduced) soil compaction performance and superior (reduced) ride harshness for the driver/operator.

Figure 6:
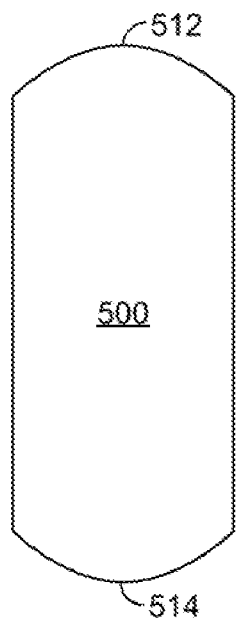
FIG. 6 is a schematic drawing illustrating an exemplary rounded contact patch shape made by an airless tire, where the contact patch shape has a rounded leading edge and a rounded trailing edge.

FIG. 6 depicts an exemplary elongated rounded contact patch shape 500 which is formed when one of the airless tires 100, 200, 300, 400 is in contact with a rolling surface in a load bearing condition. Elongated rounded contact patch shape 500 includes a rounded leading edge 512 and a rounded trailing edge 514. The axial stiffness distribution or varying axial diameter of the airless tires 100, 200, 300, 400 contribute to the forming of rounded edges 512 and 514.

Figure 7:
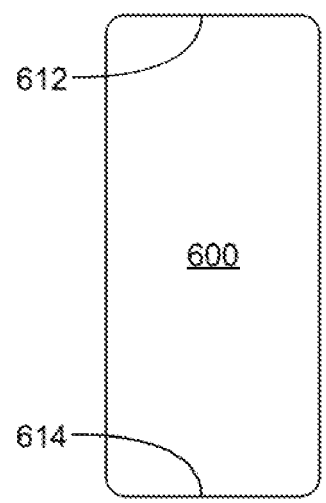
FIG. 7 is a schematic drawing illustrating an exemplary contact patch shape of a prior art tire, where the footprint has a flat leading edge and a flat trailing edge.

By contrast, FIG. 7 depicts a contact patch shape 600 of a prior art airless tire (not shown). The contact patch shape 600 includes straight leading and trailing edges 612, 614. An airless tire making a flat contact patch shape 600 results in greater ride vibration and noise than an airless tire making a rounded contact patch shape 500.

Figure 8:
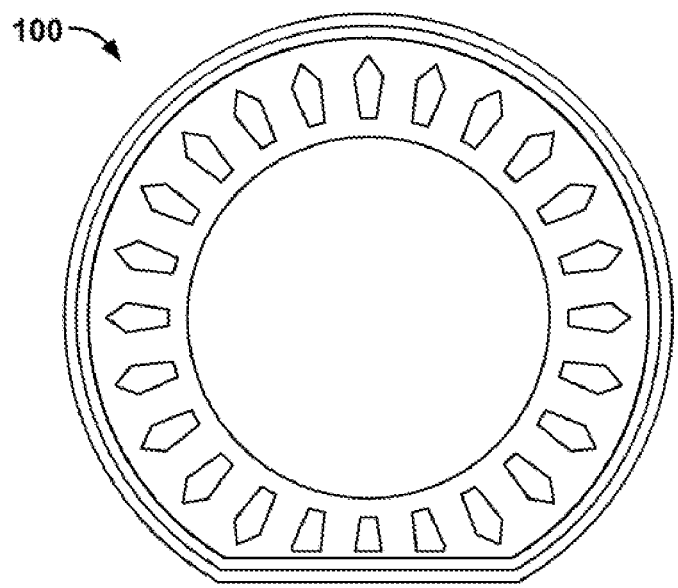
FIG. 8 is a schematic drawing illustrating a side view of the airless tire 100 bearing a load.

The contact patch shape is formed when the airless tire is in contact with a rolling surface in a load bearing condition. As one example, FIG. 8 is a schematic drawing depicting a side view of the airless tire 100 of FIGS. 1 and 2 bearing a load. In one embodiment, the effects of using variable stiffness rings in axial alignment can be enhanced based on the load distribution within the airless tire. The load carrying distribution in such an embodiment can rely more heavily on load transmitted in compression through the spokes at the bottom of the tire (between the load and the ground surface), and less on the shear band to transfer load to the top of the tire. In some NPTs the load is carried primarily through the use of a cylindrical shear band with spokes that buckle at the bottom of the tire. These NPTs are considered "top loaders" and carry most of the load through the shear band and the upper spokes in tension. Other NPTs are essentially rigid (or semi-flexible) structures that carry a majority of the load through the bottom portion, "bottom loaders." In one embodiment, the load is relatively balanced between the spoke rings and shear band such that approximately 50% of the load is carried through the bottom spokes in compression and approximately 50% of the load is carried through the shear band and upper spokes in tension. This approximate 50/50 load distribution allows for varying the diameters and stiffness of the spoke rings to create a desired contact patch shape. In this embodiment, the spokes 112 undergoing a compressive force do not buckle when airless tire 100 is loaded.

The airless tire 100 creates a rounded contact patch shape 500 on a rolling surface when a load is placed on airless tire 100. Rounded leading edge 512 is formed when airless tire 100 undergoes a loading force. Rounded leading edge 512 result in reduced ride vibration and noise by allowing the tire to pass over bumps in the road more softly than an airless tire with a straight leading edge.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An airless tire, comprising:
   a plurality of spoke rings, including a first spoke ring adjacent to a second spoke ring,
      wherein each of the plurality of spoke rings includes an annular outer surface, an annular inner surface, and a plurality of spokes extending between the outer and inner annular surfaces,
      wherein the first spoke ring has a first outer diameter and the second spoke ring has a second outer diameter different from the first outer diameter; and
   a tread layer extending circumferentially around the annular outer surfaces of the plurality of spoke rings.

2. The airless tire of claim 1, wherein the spoke rings are attached to a hub, and wherein when a load is applied to the hub, the spokes positioned below the hub are compressed and the spokes positioned above the hub are tensioned.

3. The airless tire of claim 2, wherein the tension and compression forces are approximately equal in magnitude.

4. The airless tire of claim 1, further comprising a shear band disposed about the outer annular surfaces of the spoke rings.

5. The airless tire of claim 1, wherein the tire forms a contact patch shape with a rounded leading edge when a load is applied to the tire.

6. The airless tire of claim 1, wherein the first spoke ring has a first stiffness and the second spoke ring has a second stiffness different from the first stiffness.

7. The airless tire of claim 1, further comprising a third spoke ring,
   wherein the third spoke ring includes a plurality of spokes, and
   wherein the spokes of the third spoke ring are not aligned with the spokes of the first spoke ring along an axis of rotation of the airless tire.

8. The airless tire of claim 1, wherein the spoke rings are made from a material selected from the group consisting of corded carbon-filled rubber, nylon, polyester, glass or aramid fibers with resin, thermoplastic, and urethane.

9. A tire, comprising:
   a wheel portion having an axis of rotation,
      wherein the wheel portion includes an annular outer surface, and
      wherein a distance between the axis of rotation and the annular outer surface varies along an axial direction; and
   a webbing extending from an annular inner surface of the wheel portion towards the axis of rotation.

10. The tire of claim 9, further comprising a shear band attached to the outer annular surface of the wheel portion, and wherein the webbing in a lower region of wheel portion is compressed and the webbing in an upper region of the wheel portion is tensioned by the shear band when a load is placed on the tire.

11. The tire of claim 9, wherein a stiffness of the webbing varies along the axial direction.

12. The tire of claim 9, wherein the webbing is attached to a hub in the center of the tire.

13. The tire of claim 9, wherein the wheel portion and webbing comprise a plurality of spoke rings.

14. The tire of claim 9, wherein the tire forms a contact patch shape with a rounded leading edge.

15. The tire of claim 9, wherein the webbing is formed by an additive manufacturing process.

16. A non-pneumatic tire, comprising:
   a plurality of spoke rings, including a first spoke ring disposed between a second spoke ring and a third spoke ring,
      wherein each of the plurality of spoke rings includes an annular outer surface, an annular inner surface, and a plurality of spokes extending between the outer and inner annular surfaces,
      wherein the first spoke ring has a first outer diameter, the second spoke ring has a second outer diameter different from the first outer diameter, and the third spoke ring has a third outer diameter approximately equal to the second outer diameter; and
   a tread portion covering an outer surface of the plurality of spoke rings.

17. The non-pneumatic tire of claim 16, wherein the first spoke ring has a first spoke region having a first thickness and a second spoke region having a second thickness, the first thickness being greater than the second thickness,
   wherein the second spoke ring has a third spoke region with a third thickness and a fourth spoke region with a fourth thickness, the third thickness being greater than the fourth thickness,
   wherein the first spoke region abuts the fourth spoke region, and
   wherein the second spoke region abuts the third spoke region.

18. The non-pneumatic tire of claim 16, wherein the first spoke ring has a first stiffness, the second spoke ring has a second stiffness different from the first stiffness, and the third spoke ring has a third stiffness that is approximately equal to the second stiffness.

19. The non-pneumatic tire of claim 16, further comprising a shear band attached to the outer annular surfaces of the spoke rings, wherein spokes in lower regions of spoke rings compress and spokes in upper regions of spoke rings are tensioned by the shear band when a load is placed on the non-pneumatic tire.

20. The non-pneumatic tire of claim 19, wherein the compression and tension forces are approximately equal in magnitude.

21. A non-pneumatic tire comprising:
   a hub configured to be coupled to a machine, the hub having a rotational axis about which the tire is configured to roll;
   a support structure including an inner circumferential portion associated with the hub and an outer circumferential portion radially spaced from the inner circumferential portion, the support structure extending between opposed, axially-spaced side edges of the tire, wherein the support structure includes a plurality of cavities; and a tread portion associated with the outer circumferential portion, wherein the support structure includes a plurality of layers of elastomeric material each having opposing faces lying in opposing planes substantially perpendicular to the rotational axis, wherein at least some of the layers include apertures corresponding to the cavities, and wherein the layers are chemically bonded to one another.

22. The tire of claim 21, wherein at least some of the layers are annular layers having a centrally located aperture through which the hub is received.

23. The tire of claim 21, wherein at least two adjacent layers each include respective cavity forming apertures, and wherein the cavity forming apertures correspond to at least a portion of a cavity.

24. The tire of claim 21, wherein an interface is present between adjacent layers of elastomeric material, and the interface includes a chemical bond between the adjacent layers.

25. The tire of claim 21, wherein the layers are adhesively bonded to one another.

* * * * *